United States Patent
Amir et al.

(10) Patent No.: US 10,380,860 B2
(45) Date of Patent: Aug. 13, 2019

(54) DEVICE AND METHOD FOR A SENSOR

(71) Applicant: Essence Security International (E.S.I.) Ltd., Herzlia Pituach (IL)

(72) Inventors: Ohad Amir, Herzlia (IL); Reuben Koren, Haifa (IL)

(73) Assignee: Essence Security International (E.S.I.) Ltd., Herzlia Pituach (IL)

(*) Notice: Subject to any disclaimer, the term of this patent is extended or adjusted under 35 U.S.C. 154(b) by 126 days.

(21) Appl. No.: 15/718,051

(22) Filed: Sep. 28, 2017

(65) Prior Publication Data

US 2018/0089975 A1   Mar. 29, 2018

Related U.S. Application Data

(60) Provisional application No. 62/401,203, filed on Sep. 29, 2016.

(51) Int. Cl.
*H04N 7/18* (2006.01)
*G08B 13/24* (2006.01)
(Continued)

(52) U.S. Cl.
CPC ........... *G08B 13/2494* (2013.01); *G01V 8/20* (2013.01); *G08B 13/19602* (2013.01);
(Continued)

(58) Field of Classification Search
CPC .................................................. G08B 13/2494
(Continued)

(56) References Cited

U.S. PATENT DOCUMENTS 5,905,436 A * 5/1999 Dwight .............. G08B 21/0469
340/522
6,069,655 A * 5/2000 Seeley ................... H04N 7/181
348/154
(Continued)

FOREIGN PATENT DOCUMENTS

EP   1071055   1/2001
EP   2575113   4/2013
(Continued)

OTHER PUBLICATIONS

European Search Report and the European Search Opinion dated Mar. 1, 2018 From the European Patent Office Re. Application No. 17193895.4. (8 Pages).
(Continued)

*Primary Examiner* — Leron Beck

(57) ABSTRACT

A sensing device, comprising: a first sensor, directed vertically down in relation to an identified orientation of the sensing device; at least one second sensor, directed diagonally forward in relation to the identified orientation; at least one hardware processor, electrically connected to the first sensor and the second sensor adapted to: receive at least one first signal from the first sensor or the second sensor indicating a person's presence in a monitored premises; and until receiving at least one second signal from the first sensor or the second sensor indicating an absence of the person from the monitored premises: during a predetermined delay time after receiving the first signal, determine whether one or more expected signals are received from the first sensor or the second sensor; and determine an alarm system operation to be taken subject to the one or more expected signals not being received, according to the determination.

18 Claims, 3 Drawing Sheets

(51) Int. Cl.
*G01V 8/20* (2006.01)
*H04N 5/225* (2006.01)
*G08B 13/196* (2006.01)
*G08B 21/04* (2006.01)

(52) U.S. Cl.
CPC ....... *G08B 21/0469* (2013.01); *H04N 5/2252* (2013.01); *H04N 7/181* (2013.01); *H04N 7/188* (2013.01)

(58) Field of Classification Search
USPC .......................................................... 348/154
See application file for complete search history.

(56) References Cited

U.S. PATENT DOCUMENTS

| | | | | |
|---|---|---|---|---|
| 8,564,791 | B2* | 10/2013 | Lutz | B65G 1/00 250/224 |
| 2013/0200254 | A1* | 8/2013 | Johnson | G08B 13/181 250/208.2 |
| 2016/0019774 | A1* | 1/2016 | Nurmela | G08B 21/0415 340/573.4 |
| 2016/0048721 | A1* | 2/2016 | Harper | G06K 9/00771 382/103 |
| 2016/0328941 | A1* | 11/2016 | Sundholm | G08B 13/1618 |
| 2017/0309038 | A1* | 10/2017 | Dorster | G08B 13/19 |

FOREIGN PATENT DOCUMENTS

| | | |
|---|---|---|
| FR | 2936340 | 3/2010 |
| WO | WO 01/39149 | 5/2001 |

OTHER PUBLICATIONS

Gueulle "Un Détecteur d'Inactivité à Infrarouge Passif", Electronique Radio Plans, XP000200420, 519: 50, 55-56, Feb. 1991.

* cited by examiner

DEVICE AND METHOD FOR A SENSOR

RELATED APPLICATIONS

This application claims the benefit of priority under 35 USC § 119(e) of U.S. Provisional Patent Application No. 62/401,203 filed Sep. 29, 2016, the contents of which are incorporated herein by reference in their entirety.

FIELD AND BACKGROUND OF THE INVENTION

For brevity, the term "sensor" refers to a sensing device and the term "radiation" refers to electromagnetic radiation.

The present invention, in some embodiments thereof, relates to a sensing device, and more specifically but not exclusively, to a sensing device for monitoring one or more persons.

There is a growing need to provide continuous monitoring of persons in need of constant attention, for example senior citizens having diminished mental or physical capabilities or people having impaired health. A person having diminished physical capabilities may fall and require assistance to get back up. Unfortunately, some people requiring constant attention live alone, without another person constantly around. Other people requiring constant attention live with a companion or with hired help; however it is still difficult for one person to monitor a person requiring constant attention continuously for long periods of time. For example, vital signs of a person having impaired health, for example a breathing frequency or a heartbeat frequency may degrade when the person having impaired health is not constantly monitored by another person, for example when the person is asleep.

There exist wearable devices to provide continuous indications of a person's condition. Such wearable devices may alert when a deviation in a vital sign is observed, for example when there is a decrease in breath frequency or heartbeat frequency or a when the person has not moved for an identified time period. However, such wearable devices disturb some persons; some persons are inconvenienced by wearing such wearable devices.

SUMMARY OF THE INVENTION

It is an object of the present invention to provide a device and method for a sensing device.

The foregoing and other objects are achieved by the features of the independent claims. Further implementation forms are apparent from the dependent claims, the description and the figures.

According to a first aspect of the invention, a combined sensing device comprises: a first sensor, directed substantially vertically down in relation to an identified orientation of the combined sensing device; at least one second sensor, directed substantially diagonally forward in relation to the identified orientation of the combined sensing device; and at least one hardware processor, electrically connected to the first sensor and the at least one second sensor and adapted to: receive at least one first signal from the first sensor or the at least one second sensor indicating a person's presence in a monitored premises; and until receiving at least one second signal from the first sensor or the at least one second sensor indicating an absence of the person from the monitored premises: during a predetermined delay time after receiving the first signal, determine whether one or more expected signals are received from the first sensor or the at least one second sensor; and determine an alarm system operation to be taken subject to the one or more expected signals not being received, according to the determination. The first aspect may facilitate monitoring a person only during the person's presence in the monitored premises.

With reference to the first aspect, in a first possible implementation of the first aspect of the present invention the at least one hardware processor is further configured to: in each of a plurality of iterations: receive the one or more expected signals; during the predetermined delay time after receiving the one or more expected signals, determine a second determination whether one or more additional expected signals are received from the first sensor or the at least one second sensor; and determine the alarm system operation according to the second determination. Continuous monitoring may facilitate increasing a person's wellbeing and allow early detection of problematic conditions.

With reference to the first aspect, in a second possible implementation of the first aspect of the present invention the at least one hardware processor is further configured to: instruct activation of at least one of the first sensor and the at least one second sensor; receive at least one new signal from the first sensor or the at least one second sensor; and determine the alarm system operation according to an analysis of the at least one new signal. Activating one or more sensors only upon detecting a person's presence may facilitate reduced power consumption and reduced radiation levels.

With reference to the first aspect, in a third possible implementation of the first aspect of the present invention at least one of the first sensor and the at least one second sensor comprises a plurality of Fresnel lenses. A first lens of the plurality of Fresnel lenses has a first angle of view; a second lens of the plurality of Fresnel lenses has a second angle of view; and the first angle of view and the second angle of view are different. Different angles of view allow monitoring different areas of monitored premises.

With reference to the first aspect, in a fourth possible implementation of the first aspect of the present invention the at least one first signal comprises a motion detection indication. Optionally, the at least one first signal is selected from a group consisting of: a captured audio signal, a captured video stream, a captured image, an open door indication, a closed door indication, a motion detection indication and a presence indication. Optionally, the at least first signal is a captured image or a captured video stream and the at least one hardware processor is further adapted to analyze the captured image or captured video stream to determine the person's presence in the premises.

With reference to the first aspect, in a fifth possible implementation of the first aspect of the present invention the at least one hardware processor is further adapted to analyze the at least one first signal. The one or more expected signals are determined according to an outcome of said analysis. Determining expected signals according to a first received signal may facilitate a flexible and multipurpose sensor.

With reference to the first aspect, in a sixth possible implementation of the first aspect of the present invention the one or more expected signals comprise a motion detection indication. Optionally, the one or more expected signals are selected from a group consisting of: a captured audio signal, a captured video stream, and a captured image. Monitoring a person's motion may provide an indication of the person's wellbeing.

With reference to the first aspect, in a seventh possible implementation of the first aspect of the present invention the at least one hardware processor is further adapted to analyze the one or more expected signals. Optionally, analyzing the one or more expected signals comprises respiratory rate estimation. Optionally, the one or more expected signals comprise at least one audio signal; and the respiratory rate estimation uses the at least one audio signal. Estimating a person's respiratory rate from an audio signal is a non-intrusive method for estimating the respiratory rate. The person's respiratory rate may serve as an indication of the person's wellbeing.

With reference to the first aspect, in an eighth possible implementation of the first aspect of the present invention the alarm system operation is selected from a group of operations consisting of: delivering an electrical current to an audio device capable of emitting an audio signal, delivering an electrical current to a visual device capable of emitting a visual signal, sending a message to at least one designated person, and displaying a message on a monitor. Optionally, the system further comprises at least one control hardware processor connected to the at least one hardware processor. Optionally, the group of operations further consists of sending a message to the at least one control hardware processor.

With reference to the first aspect, in a ninth possible implementation of the first aspect of the present invention the first sensor and the one or more second sensors are installed in a common housing. Optionally, the first sensor has a first line of sight; the at least on second sensor has a second line of sight; and the first line of sight is substantially perpendicular to the second line of sight. A common housing may facilitate reduced costs of installation.

With reference to the first aspect, in a tenth possible implementation of the first aspect of the present invention the first sensor is installed in a first housing, the one or more second sensors are installed in second housing, and the first housing is attached to an external surface of the second housing. Using separate housings may facilitate flexibility and modularity in system design and installation.

Other systems, methods, features, and advantages of the present disclosure will be or become apparent to one with skill in the art upon examination of the following drawings and detailed description. It is intended that all such additional systems, methods, features, and advantages be included within this description, be within the scope of the present disclosure, and be protected by the accompanying claims.

Unless otherwise defined, all technical and/or scientific terms used herein have the same meaning as commonly understood by one of ordinary skill in the art to which the invention pertains. Although methods and materials similar or equivalent to those described herein can be used in the practice or testing of embodiments of the invention, exemplary methods and/or materials are described below. In case of conflict, the patent specification, including definitions, will control. In addition, the materials, methods, and examples are illustrative only and are not intended to be necessarily limiting.

BRIEF DESCRIPTION OF THE SEVERAL VIEWS OF THE DRAWINGS

Some embodiments of the invention are herein described, by way of example only, with reference to the accompanying drawings. With specific reference now to the drawings in detail, it is stressed that the particulars shown are by way of example and for purposes of illustrative discussion of embodiments of the invention. In this regard, the description taken with the drawings makes apparent to those skilled in the art how embodiments of the invention may be practiced.

In the drawings.

DESCRIPTION OF SPECIFIC EMBODIMENTS OF THE INVENTION

Figure 1A:
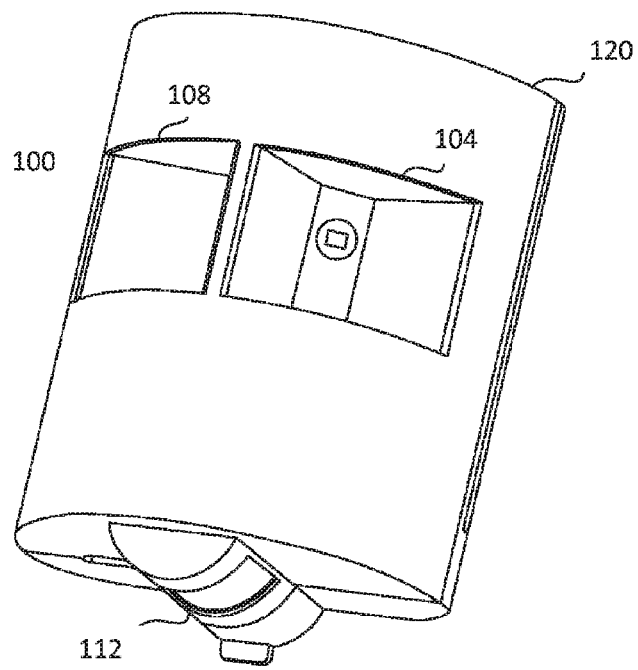
FIGS. 1A and 1B are respectively a schematic illustration and a schematic block diagram of an exemplary combined sensor, according to some embodiments of the present invention.

The present invention, in some embodiments thereof, relates to a sensing device, and more specifically but not exclusively, to a sensing device for monitoring one or more persons. Some aspects of the present invention relate to, but are not limited to, monitoring a person within a space such as a room.

Monitoring and tracking of a person's vital signs and movement are of importance for various applications including, but not limited to, infant care, elderly care, human activity behind barriers, and bio-medical applications. A person, and in particular a person who needs care, may encounter any one of a variety of problems, even in a relatively safe environment. For example a person entering a bedroom may fall on the way to the bed, fall out of the bed after lying down on the bed or fall on the way from the bed to exit the room. A person lying asleep in a bed may suffer from a sleep disorder such as apnea, or any other degradation of vital signs during sleep time. Wearable devices providing continuous indications of a person's condition exist, but some persons are disturbed by such devices and find them uncomfortable.

The present invention, in some embodiments thereof, proposes using a combined sensing device to detect a presence of a person in an identified location, such as a room, and continuously monitor the person according to the identified location, until an absence of the person from the identified location is detected. For example, detect a person entering a room and then continuously monitor the person until the person exits the room. In some embodiments, the combined sensing device comprises at least two sensors which are used to detect the person's presence and absence in different parts of the identified location. In some embodiments, the combined sensing device comprises at least one sensor which is used to detect the person's presence and absence from the location, and at least one other sensor which is used to monitor the person's activity or vital signs. In some other embodiments the at least one other sensor used to monitor the person's activity or vital signs is the same at least one sensor used to detect the person's presence and absence from the location.

Optionally, the combined sensing device detects a problematic event while monitoring the person's activity or vital signs, by determining whether one or more indications are detected during a predetermined delay time after detecting the presence. For example, upon detecting a presence of a person in a room known not to be a bedroom, an expected indication may be an indication of movement. When no expected movement indication is detected within the predetermined delay time after detecting the presence in the room, it may be assumed that the person has fallen. In another example, upon detecting a presence of the person in bed, the person's vital signs may be monitored and an expected indication may be a respiratory rate within a predefined healthy range, such as 12-18 breaths per minute. When no expected breath indication is detected within the predetermined delay time after detecting the presence in the bed, or when a detected breath indication indicates a respiratory rate higher or lower than the predefined healthy range, it may be assumed the person is suffering a respiratory problem. Upon determination of a problematic event such as a fall or a respiratory problem, the combined sensor optionally determines an alarm system operation, for example generating an alarm signal that can be noticed by an attending person designated to monitor the alarm signal such as an audio signal, a visual signal, or a message on a monitor. Optionally an alarm system operation is sending a message to at least one designated person, for example a care giver or a relative of the monitored person.

Optionally, a problematic event is detected by correlating the one or more indications detected after detecting the presence, with an expected pattern of events. For example, it may be expected that upon entering a room a person moves towards a known piece of furniture, such as a bed or a chair, and sits on the piece of furniture. Detection of the person moving back and forth in the room may be considered suspicious and indicating a problem, for example a person suffering from dementia and becoming disoriented.

Optionally, continuously monitoring the person comprises repeatedly determining whether one or more additional expected indications are detected during the predetermined delay time after previously detecting at least one expected indication. Optionally, as long as expected indications are detected, no alarm operation is determined. Only when an expected indication is not detected within the predetermined delay time an alarm operation is optionally determined.

Continuous monitoring optionally continues until the person's absence is detected.

Initiating continuous monitoring upon detection of a person's presence in an identified location increases the person's safety by ensuring activation of the continuous monitoring, independently of the monitored person or another person activating the continuous monitoring and without the discomfort to the monitored person of a wearable device. In addition, initiating continuous monitoring upon detection of a person's presence allows activating the at least one other sensor only upon detection of the presence, thus reducing power consumption and radiation emission of the combined sensor.

The at least one sensor and the at least one other sensor may share a housing and may be connected to at least one common hardware processor such that the at least one sensor and the at least one other sensor appear as a combined single sensor to a control component, comprising at least one control hardware processor, connected to the at least one sensor and the at least one other sensor. Managing the combined sensor as a single sensor may reduce installation and management costs, by eliminating the need to separately install and manage each of the at least one sensor and the at least one other sensor.

Identifying a pattern in motions or vital signs of a monitored person is possible also using a camera, however there may be conditions where use of a camera is not possible due to privacy or legal concerns. In addition, analysis of camera images may require complex computations and may be costly in computation resources. In addition, a cost of a camera may prohibit use of a camera in some conditions.

The present invention, in some embodiments thereof, enables identifying a person's motion patterns using a plurality of Passive Infra-red (PIR) motion sensors, directed at a plurality of focus areas. The focus areas may be contiguous. The focus areas may be non-contiguous. Sensing from a plurality of focus areas allows reducing cost of the sensing device by using cheaper, simpler motion sensors each having a limited focus area. A combination of a plurality of focus areas may provide sufficient coverage of the monitored premises, including when the focus areas are non-contiguous.

Before explaining at least one embodiment of the invention in detail, it is to be understood that the invention is not necessarily limited in its application to the details of construction and the arrangement of the components and/or methods set forth in the following description and/or illustrated in the drawings and/or the Examples. The invention is capable of other embodiments or of being practiced or carried out in various ways.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing.

Computer readable program instructions described herein can be downloaded to respective computing/processing devices from a computer readable storage medium or to an external computer or external storage device via a network, for example, the Internet, a local area network, a wide area network and/or a wireless network.

The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Figure 1B:
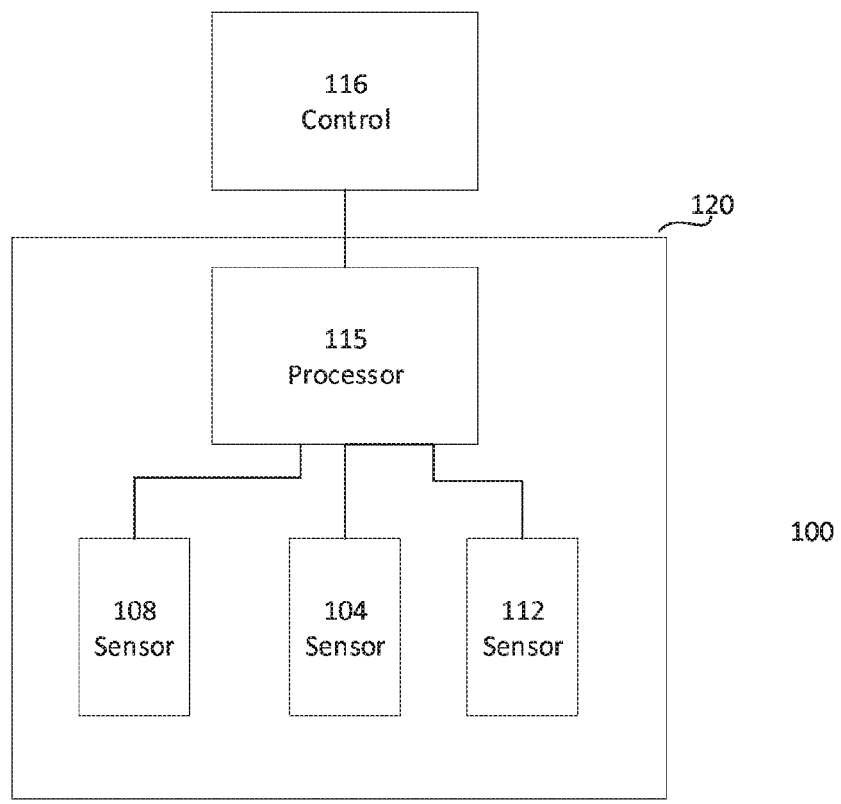

Reference is now made to FIGS. 1A and 1B, showing respectively a schematic illustration and a schematic block diagram of an exemplary combined sensor 100, according to some embodiments of the present invention. Optionally, combined sensor 100 comprises a first sensor 112. Optionally the first sensor is a motion sensor, for example a PR motion sensor. When the first sensor is a PIR motion sensor, the PIR motion sensor may be adapted to detect motion based on a difference between a temperature of a person's body and an ambient temperature of the environment of the PIR motion sensor. Optionally the first sensor is another type of sensor or a capture device, for example the first sensor is optionally a video camera, an audio capture device such as a microphone, a radar or an Ultrasound imaging device. Optionally the combined sensor is implemented such that first sensor 112 is directed substantially vertically down in relation to an identified orientation of the sensing device such that when the combined sensor is installed on a vertical surface, for example a wall, the first sensor is directed substantially vertically down in relation to the vertical surface. Optionally, combined sensor 100 comprises more than one sensor directed substantially vertically down in relation to the identified orientation of the sensing device. For example, when first sensor 112 is installed above a door of a room, the first sensor captures motion of people or objects entering or exiting the room.

Optionally, combined sensor 100 comprises one or more second sensors 104 and/or 108. Optionally, at least one of the one or more second sensors is another motion sensor, for example a second PR motion sensor. When the at least one of the one or more second sensors is a second PR motion sensor, the second PIR motion sensor may be adapted to detect motion based on a difference between a temperature of a person's body and an ambient temperature of the environment of the second PR motion sensor. Optionally, at least one of the one or more second sensors is another type of sensor or a capture device, for example the at least one of the one or more second sensors is optionally a video camera, an audio capture device such as a microphone, a radar or an Ultrasound imaging device. Optionally, the combined sensor is implemented such that one or more second sensors are directed substantially diagonally forward or sideways in relation to an identified orientation of the sensing device such that when the combined sensor is installed on a vertical surface, for example a wall, the one or more second sensors are directed substantially diagonally forward or sideways in relation to the vertical surface. When first sensor 112 is a PR motion sensor, first sensor 112 optionally comprises at least one first lens having at least one first certain focal distance. The at least one first certain focal distance may be in accordance with a monitored room's dimensions, for example between 2 meters and 5 meters. Alternatively, the at least one first certain focal distance may be in accordance with a monitored room's height, for example between 1.50 meters and 3 meters. When one or more second sensors 104 and 108 are a PIR motion sensor, one or more sensors 104 and 108 optionally comprise at least one second lens having at least one second certain focal distance. The at least one second certain focal distance may be in accordance with a monitored room's dimensions, for example between 2 meters and 5 meters. Optionally, the at least one first focal distance is shorter than the at least one second focal distance.

As used in this disclosure, a line of sight is a straight line along which a sensor is configured to detect radiation. Optionally, one or more second sensors 104 and 108 each have a line of sight different from a line of sight of first sensor 112. Optionally, one or more second sensors 104 and 108 are installed such that a line of sight of one or more second sensors 104 and 108 is substantially perpendicular to a line of sight of first sensor 112.

Optionally, sensors 104, 108 and 112 are installed in a shared housing 120. Optionally, sensors 104, 108 and 112 are connected to at least one hardware processor 115, for the purpose of processing signals produced by sensors 104, 108 and 112. Optionally, at least one hardware processor 115 is installed in housing 120, and sensors 104, 108 and 112 are electrically connected to at least one hardware processor 115. Optionally, sensors 104, 108 and 112 are connected to at least one hardware processor 115 via a data communication network interface (not shown). The data communication network may be wired, for example an Ethernet network. The data communication network may be wireless, for example a Wireless Fidelity (Wi-Fi) network. One or more surfaces of housing 120 may be of a shape having a curvature. Optionally, at least one of sensors 104, 108 and 112 is installed behind a transparent window in housing 120. The transparent window is optionally made of glass or a transparent plastic material. The transparent window optionally functions as one or more lenses. Housing 120 may comprise internal members for separating one or more second sensors 104 and 108 from each other, for example a dividing member installed between sensor 104 and 108. Optionally, the dividing member prevents one of sensors 104 and 108 from capturing motion in one or more other areas the other of sensors 104 and 108 is configured to monitor.

Optionally, at least one of sensors 112, 104 and 108 has a second housing, attached externally to housing 120. Having the second housing facilitates separate manufacturing of sensors 112, 104 and 108. In addition, having the second housing facilitates modular installation of the combined sensor and allows simpler and cheaper replacement of one of sensors 112, 104 and 108 to adjust to dynamically changing needs or to repair a fault than when sensor 112, 104 and 108 share housing.

In some embodiments of the present invention, sensor 104 and sensor 108 have a shared housing and sensor 112 has the second housing.

In embodiments where one of sensors 104, 108 or 112 is a PIR motion sensor having a lens, the lens is optionally a Fresnel lens having a plurality of focusing areas for capturing motion at a plurality of angle ranges. The plurality of focusing areas are optionally non-contiguous. The plurality of angle ranges are optionally non-contiguous. Optionally, sensor 104 has a first angle range and sensor 108 has a second angle range contiguous to the first angle range. Optionally, the sum of the first angle range and the second angle range is approximately 180°. Optionally, the first angle range and the second angle range are each approximately 90°. Optionally, sensor 104 is adapted to capture motion at a first plane in the monitored premises space and sensor 108 is configured to capture motion at a second plane in the monitored premises space. Optionally, the first plane is significantly different from the second plane. The first plane may be at an angle to the second plane, perpendicular to the second plane or opposite to the second plane. For example, sensor 104 may be directed at a first wall of a room and sensor 108 may be directed at a second wall of the room.

Optionally, at least one hardware processor 115 is connected to a management component comprising at least one control hardware processor 116. Optionally, at least one hardware processor 115 is connected to the at least one control hardware processor via a second data communication network interface, for example an Ethernet network interface or a Wi-Fi network interface.

In some embodiments of the present invention the combined sensor is installed on a wall of a room or from a ceiling of a room, for example over a doorstep, over an entrance to a room or over a bed. When installed over a bed, the first sensor is optionally used to detect a person's presence in the bed, and the one or more second sensors are optionally used to monitor the person's vital signs while in bed. When installed over an entrance to a room, the first sensor is optionally used to detect a person entering the room, and the one or more second sensors are optionally used to monitor the person's movements in the room. The present invention, in embodiments having more than one second sensor, enables determining information about a person's movement in a monitored premises using PIR motion sensors without requiring capturing one or more images by a camera. A PIR sensor may be cheaper than a camera and less susceptible to damage than camera, making use of one or more PIR sensors provides a more reliable solution for continuously monitoring a person than a solution using a camera. In addition, motion detection by a PR sensor is less invasive of the person's privacy than an image capturing the person moving.

Figure 2:
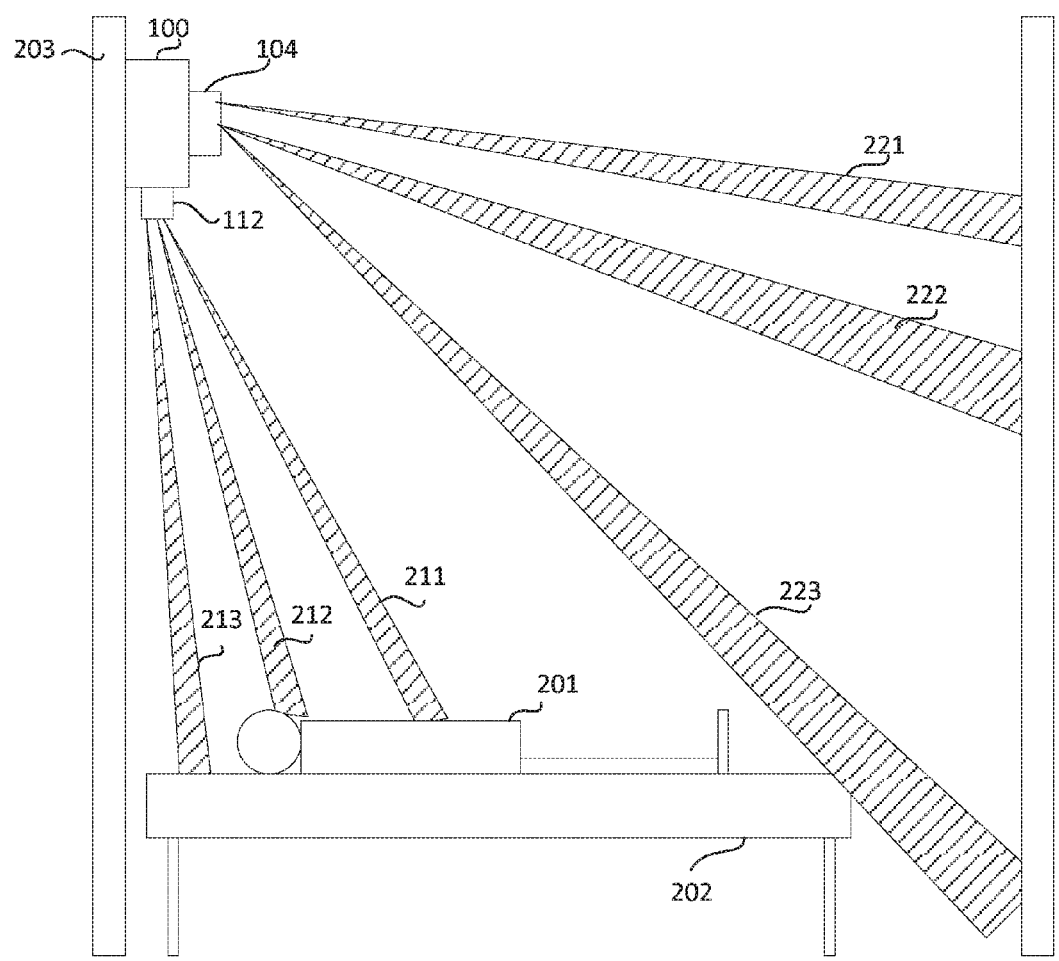
FIG. 2 is a schematic illustration of an exemplary environment in which a combined sensor is used according to some embodiments of the present invention.

Reference is now made to FIG. 2, showing a schematic illustration of an exemplary environment in which a combined sensor is used according to some embodiments of the present invention. In such an environment, combined sensor 100 is installed on wall 203 of a room for the purpose of monitoring a person 201 lying on a bed 202. Optionally, sensor 112 is a first PIR motion sensor having a first Fresnel lens having a first plurality of focusing areas. For example, sensor 112 may detect motion in non-contiguous areas 211, 212 and 213, covering part of the person's head and torso. Optionally, sensor 104 is a second PR motion sensor having a second Fresnel lens having a second plurality of focusing areas. For example, sensor 104 may detect motion in non-contiguous areas 221, 222 and 223, covering a plurality of areas of the foot of bed 202, the room floor and the room volume.

In embodiments where sensor 100 is used to monitor a sleeping person, but not exclusively in such embodiments, sensor 104 or sensor 112 may be one of a video camera, an audio capture device, a radar or an ultrasound imaging device.

Some embodiments of the present invention implement the following optional method.

Figure 3:
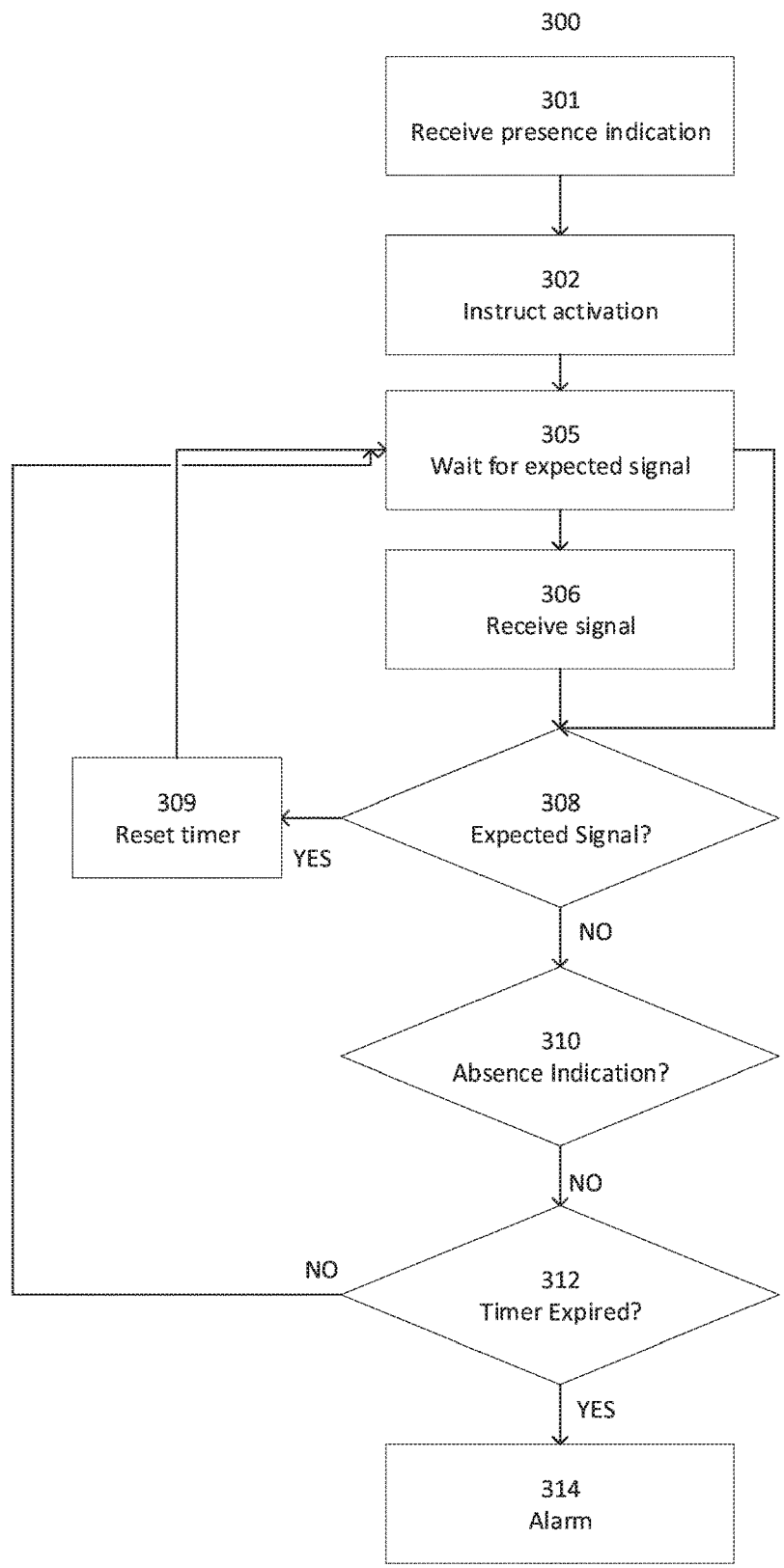
FIG. 3 is a flowchart schematically representing an optional flow of operations, according to some embodiments of the present invention.

Reference is now made to FIG. 3, showing a flowchart schematically representing an optional flow of operations, according to some embodiments of the present invention. In such embodiments, the at least one hardware processor receives in 301 at least one first signal from the first sensor and/or the one or more second sensors, indicating a person's presence in a monitored premises. For example, the at least one first signal may be a signal from a motion sensor or a video camera installed above an entrance to a room, indicating a person entering the room. For another example, the at least one first signal may be a signal from a motion sensor directed at part of the volume of a room, detecting movement in the room. Upon receiving the at least one first signal, the at least one hardware processor optionally waits in 305 for one or more expected signals, for a predetermined delay time after receiving the at least one first signal. The one or more expected signals are optionally a motion detection indication, a captured audio signal, a captured video stream or a captured image. Optionally, in 306 the at least one hardware processor receives at least one new signal from the first sensor or the one or more second sensors. The at least one new signal may be the one or more expected signals. Upon optionally determining in 308 that the at least one new signal is, or is equivalent or comparable to the one or more expected signals, the at least one hardware processor may reset a timer to the predetermined delay time in 309 and optionally again wait in 305 for one or more additional expected signals. Steps 305, 306, 308 and 309 are optionally repeated continuously in a plurality of iterations.

When the at least one hardware processor determines in 308 that the received at least one new signal is not the one or more expected signals or if no signal was received on 306, in 310 the at least one hardware processor optionally determines the at least one new signal is at least one second signal indicating an absence of the person from the monitored premises. For example, the at least one second signal may be a signal from a motion sensor or a video camera installed above an entrance to a room, indicating a person leaving the room. When no absence indication is determined in 310 or no signal is received on 306, the at least one hardware processor optionally determines in 312 that the predetermined delay time has not passed and optionally returns to step 305 to repeat waiting for the one or more expected signals.

However, upon determining in 312 that the predetermined delay time has passed, in 314 the at least one hardware processor optionally determines an alarm system operation. Examples of an alarm system operation are delivering an electrical current to an audio device capable of emitting an audio signal, delivering an electrical current to a visual device capable of emitting a visual signal, sending a message to at least one designated person and displaying a message on a monitor. When an audio device, a visual device or a monitor are electrically connected to the at least one hardware processor, the at least one hardware processor may execute the alarm system operation. Optionally, when the at least one hardware processor is connected to at least one control hardware processor, the alarm system operation may be sending a message to the at least one control hardware processor. Optionally, the at least one control hardware processor delivers an electrical current to an audio device capable of emitting an audio signal, delivers an electrical current to a visual device capable of emitting a visual signal, sends a message to at least one designated person or displays a message on a monitor.

Optionally, the one or more second sensors are not activated until the at least one first signal is received. In this case, the at least one hardware processor optionally instructs in 302 activation of at least one of the one or more second sensors.

Optionally, the at least one hardware processor analyzes the at least one first signal, and determines what the one or more expected signals are according to the analysis of the at least one first signal. For example, when the at least one first signal indicates a person lying in a bed, the at least one hardware processor may determine the one or more expected signals comprise at least one respiratory rate monitoring signal. In another example, when the at least one first signal indicates a person entering a room, the at least one hardware processor may determine the one or more expected signals comprise at least one motion detection signal in the volume of the room.

Optionally, detection of a person's presence in a room is determined by the at least one hardware processor analyzing an image captured by a camera or a video stream captured by a video camera. Optionally, detection of a person's presence in a room is determined by the at least one hardware receiving one or more motion detection signals from one or more motion sensors of the combined sensor.

Optionally, the at least one hardware processor analyzes the one or more expected signals. For example, the at least one hardware processor optionally analyzes the one or more expected signals to determine a respiratory rate estimation. Optionally, the respiratory rate estimation is determined by analyzing a captured audio signal in the one or more expected signals. For example, respiratory rate may be estimated by analyzing the captured audio signal to identify a plurality of sounds indicating respiration at a plurality of respiration times and determining a rate from a plurality of time differences between the plurality of respiration times. In another example, respiratory rate may be estimated by analyzing a captured video signal comprising video frames showing the person's torso at a plurality of times. In another example, the at least one hardware processor optionally analyzes the one or more expected signals to determine a movement pattern of a person in the monitored premises. In some embodiments, the one or more expected signals are received from one or more motion sensors of the combined sensor.

Optionally, the at least one control hardware processor is adapted to implement at least part of method 300, in addition or alternately to the at least one hardware processor implementing all or part of method 300.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

It is expected that during the life of a patent maturing from this application many relevant sensors and capture devices will be developed and the scope of the terms "sensor" and "capture device" is intended to include all such new technologies a priori.

As used herein the term "about" refers to ±10%.

The terms "comprises", "comprising", "includes", "including", "having" and their conjugates mean "including but not limited to". This term encompasses the terms "consisting of" and "consisting essentially of".

The phrase "consisting essentially of" means that the composition or method may include additional ingredients and/or steps, but only if the additional ingredients and/or steps do not materially alter the basic and novel characteristics of the claimed composition or method.

As used herein, the singular form "a", "an" and "the" include plural references unless the context clearly dictates otherwise. For example, the term "a compound" or "at least one compound" may include a plurality of compounds, including mixtures thereof.

The word "exemplary" is used herein to mean "serving as an example, instance or illustration". Any embodiment described as "exemplary" is not necessarily to be construed as preferred or advantageous over other embodiments and/or to exclude the incorporation of features from other embodiments.

The word "optionally" is used herein to mean "is provided in some embodiments and not provided in other embodiments". Any particular embodiment of the invention may include a plurality of "optional" features unless such features conflict.

Throughout this application, various embodiments of this invention may be presented in a range format. It should be understood that the description in range format is merely for convenience and brevity and should not be construed as an inflexible limitation on the scope of the invention. Accordingly, the description of a range should be considered to have specifically disclosed all the possible subranges as well as individual numerical values within that range. For example, description of a range such as from 1 to 6 should be considered to have specifically disclosed subranges such as from 1 to 3, from 1 to 4, from 1 to 5, from 2 to 4, from 2 to 6, from 3 to 6 etc., as well as individual numbers within that range, for example, 1, 2, 3, 4, 5, and 6. This applies regardless of the breadth of the range.

Whenever a numerical range is indicated herein, it is meant to include any cited numeral (fractional or integral) within the indicated range. The phrases "ranging/ranges between" a first indicate number and a second indicate number and "ranging/ranges from" a first indicate number "to" a second indicate number are used herein interchangeably and are meant to include the first and second indicated numbers and all the fractional and integral numerals therebetween.

It is appreciated that certain features of the invention, which are, for clarity, described in the context of separate embodiments, may also be provided in combination in a single embodiment. Conversely, various features of the invention, which are, for brevity, described in the context of a single embodiment, may also be provided separately or in any suitable subcombination or as suitable in any other described embodiment of the invention. Certain features described in the context of various embodiments are not to be considered essential features of those embodiments, unless the embodiment is inoperative without those elements.

All publications, patents and patent applications mentioned in this specification are herein incorporated in their entirety by reference into the specification, to the same extent as if each individual publication, patent or patent application was specifically and individually indicated to be incorporated herein by reference. In addition, citation or identification of any reference in this application shall not be construed as an admission that such reference is available as prior art to the present invention. To the extent that section headings are used, they should not be construed as necessarily limiting.

What is claimed is:

1. A combined sensing device, comprising:
   a first sensor, directed substantially vertically down in relation to an identified orientation of the combined sensing device;
   at least one second sensor, directed substantially diagonally forward in relation to said identified orientation of said combined sensing device; and
   at least one hardware processor, electrically connected to said first sensor and said at least one second sensor and adapted to:
      receive at least one first signal from said first sensor or said at least one second sensor indicating a person's presence in a monitored premises; and
      until receiving at least one second signal from said first sensor or said at least one second sensor indicating an absence of said person from said monitored premises:
         during a predetermined delay time after receiving said first signal, determine whether one or more expected signals are received from said first sensor or said at least one second sensor; and
         determine an alarm system operation to be taken subject to said one or more expected signals not being received, according to said determination.

2. The combined sensing device of claim 1, wherein said at least one hardware processor is further configured to:
   in each of a plurality of iterations:
      receive said one or more expected signals;
      during said predetermined delay time after receiving said one or more expected signals, determine a second determination whether one or more additional expected signals are received from said first sensor or said at least one second sensor; and
      determine said alarm system operation according to said second determination.

3. The combined sensing device of claim 1, wherein said at least one hardware processor is further configured to:
   instruct activation of at least one of said first sensor and said at least one second sensor;
   receive at least one new signal from said first sensor or said at least one second sensor; and
   determine said alarm system operation according to an analysis of said at least one new signal.

4. The combined sensing device of claim 1, wherein at least one of said first sensor and said at least one second sensor comprises a plurality of Fresnel lenses;
   wherein a first lens of said plurality of Fresnel lenses has a first angle of view;
   wherein a second lens of said plurality of Fresnel lenses has a second angle of view; and
   wherein said first angle of view and said second angle of view are different.

5. The combined sensing device of claim 1, wherein said at least one first signal comprises a motion detection indication.

6. The combined sensing device of claim 1, wherein said at least one hardware processor is further adapted to analyze said at least one first signal; and
   wherein said one or more expected signals are determined according to an outcome of said analysis.

7. The combined sensing device of claim 1, wherein said at least one first signal is selected from a group consisting of: a captured audio signal, a captured video stream, a captured image, an open door indication, a closed door indication, a motion detection indication and a presence indication.

8. The combined sensing device of claim 1, wherein said at least first signal is a captured image or a captured video stream;
   and wherein said at least one hardware processor is further adapted to analyze said captured image or captured video stream to determine said person's presence in said premises.

9. The combined sensing device of claim 1, wherein said one or more expected signals comprise a motion detection indication.

10. The combined sensing device of claim 1, wherein said one or more expected signals is selected from a group consisting of: a captured audio signal, a captured video stream, and a captured image.

11. The combined sensing device of claim 1, wherein said at least one hardware processor is further adapted to analyze said one or more expected signals.

12. The combined sensing device of claim 11, wherein analyzing said one or more expected signals comprises respiratory rate estimation.

13. The combined sensing device of claim 12, wherein said one or more expected signals comprise at least one audio signal; and
   wherein said respiratory rate estimation uses said at least one audio signal.

14. The combined sensing device of claim 1, wherein said alarm system operation is selected from a group of operations consisting of: delivering an electrical current to an audio device capable of emitting an audio signal, delivering an electrical current to a visual device capable of emitting a visual signal, sending a message to at least one designated person, and displaying a message on a monitor.

15. The combined sensing device of claim 14, further comprising at least one control hardware processor connected to said at least one hardware processor; and
   wherein said group of operations further consists of: sending a message to said at least one control hardware processor.

16. The combined sensing device of claim 1, wherein said first sensor has a first line of sight;
   wherein said at least one second sensor has a second line of sight; and
   wherein said first line of sight is substantially perpendicular to said second line of sight.

17. The combined sensing device of claim 1, wherein said first sensor and said one or more second sensors are installed in a common housing.

18. The combined sensing device of claim 1, wherein said first sensor is installed in a first housing;
   wherein said one or more second sensors are installed in second housing; and
   wherein said first housing is attached to an external surface of said second housing.

* * * * *